Patented June 10, 1930

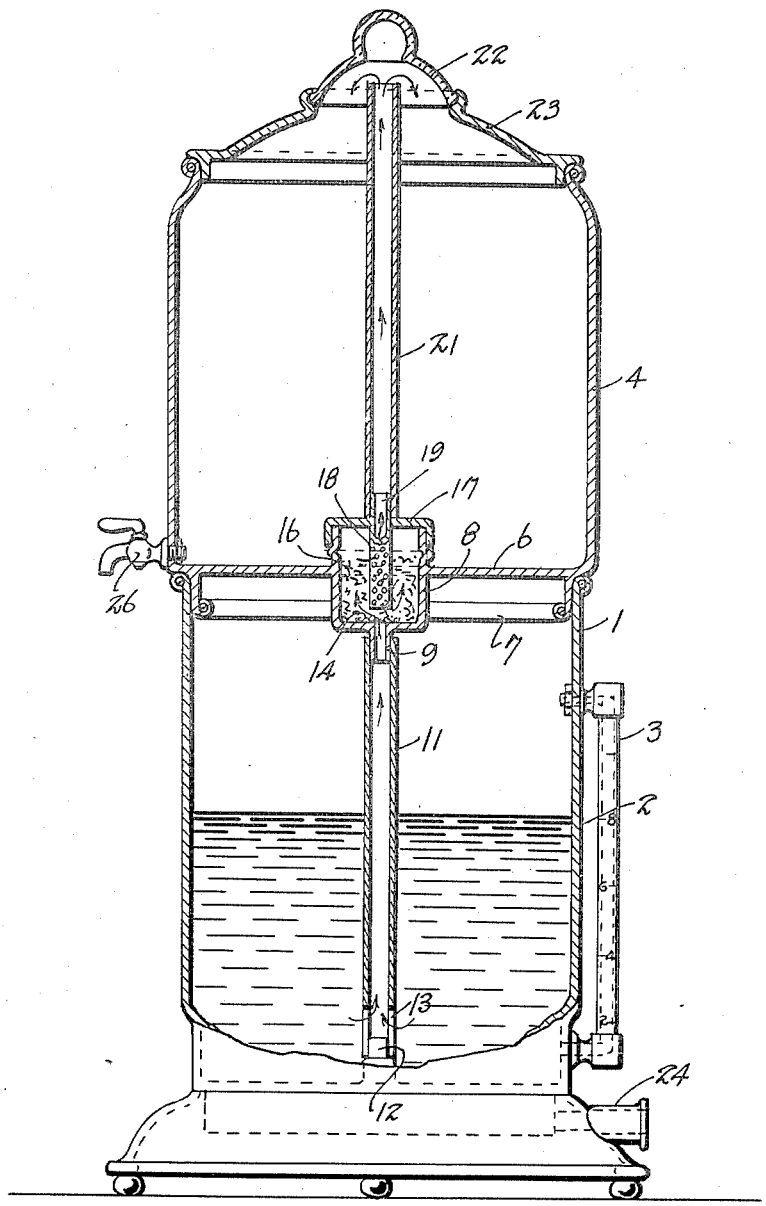

1,762,303

UNITED STATES PATENT OFFICE

JOHN A. McBRIDE, OF ELKO, NEVADA

ELECTRIC TEA URN OR PERCOLATOR

Application filed June 25, 1928. Serial No. 288,051.

The present invention relates to improvements in tea urns, percolators and the like, and its principal object is to provide a device of this character that is particularly efficient in extracting what is valuable from the tea leaves, in fully preserving the aroma and in excluding the objectionable properties of the tea leaves.

Further objects and advantages of my invention will appear as the specification proceeds.

The preferred form of my invention is illustrated in the accompanying drawing which shows a vertical section through my improved tea urn.

While I have shown only the preferred form of the invention, I wish to have it understood that various changes or modifications may be made within the scope of the claims hereto attached without departing from the spirit of the invention.

It should be particularly understood that while I have described my device as a tea urn, it may be used in connection with other materials in which the substance is extracted from a solid product by passing water thereover or therethrough.

In its preferred form my tea urn 1 comprises an open vessel 2 of any suitable form adapted to accommodate a desired amount of water, the quantity of which may be ascertained by means of a suitable sight glass 3 mounted along the side of the vessel. The sight glass may be calibrated to indicate the number of cups of water within the vessel. On the top of this vessel fits another vessel 4, the bottom 6 of which forms a cover for the vessel 1 while depending flange 7 fits inside of the vessel and makes the same substantially steam-tight.

The second vessel 4 has a cup 8 formed in the bottom 6, the cup terminating in a small depending pipe section 9 adapted to have a longer pipe 11 telescoped thereon. The pipe 11 extends nearly to the bottom of the first vessel and fits over a guide pin 12 rising from the bottom. It is slotted as shown at 13 to allow water to be forced therethrough by steam pressure. The slots 13 are provided near the bottom of the vessel 1.

The cup 8 has a strainer 14 lying in the bottom so as to prevent tea leaves, indicated at 16, from dropping through the pipe 11.

The cup is closed by means of a lid 17 which has a perforated pipe 18 extending downwardly therefrom into the body of the tea leaves and which extends upwardly above the lid as shown at 19 to serve as a fastening means for an upwardly extending pipe 21, which latter rises to within close proximity of the glass cap 22 forming part of the lid 23 closing the upper vessel.

The water in the vessel 1 may be heated by any suitable means, as for instance by an electric heater indicated at 24.

The operation of my device is apparent from the foregoing description. When heat is applied to the bottom of the vessel 1, the water in the vessel begins to boil and develops steam, which having no outlet, forces the water to rise through the tube 11 into the cup 16 where it extracts the tea from the leaves. The water now made into tea rises further through the perforated pipe 18 and the long pipe 21 and finally drops into the second vessel 4, from which it may be drained through the faucet 26. After the water level has dropped below the slots 13, the device will cease to operate in the manner described because now the steam may escape through the slots 13.

The sight tube 3 allows the water available for tea to be ascertained beforehand in numbers of cups.

I claim:

1. A tea urn comprising an open top vessel, a second vessel having a bottom flange fitting into the upper section of the first vessel and having a cup formed integrally in the bottom thereof, a pipe extending downwardly from the cup into the first vessel, a lid for the cup having a perforated pipe extending downwardly into the cup and a pipe communicating with the perforated pipe and extending upwardly into the second vessel.

2. A tea urn comprising an open top vessel, a closure for the same having a cup for tea leaves formed integrally therein, a pipe extending downwardly from the cup so as to cause water to rise through the pipe and the cup when heat is applied to the vessel, and a lid for the cup having a pipe extending upwardly and causing the liquid tea to be discharged therethrough.

JOHN A. McBRIDE.